United States Patent [19]

Inokuchi et al.

[11] 4,205,056

[45] May 27, 1980

[54] PROCESS FOR ORTHO-PARA-HYDROGEN CONVERSION

[75] Inventors: Hiroo Inokuchi, Okazaki; Kentaro Murano, Ibaraki; Hiroshi Kawazura, Kamifukuoka; Tsutomu Kobayashi, Ibaraki, all of Japan

[73] Assignee: Japan Synthetic Rubber Company, Limited, Tokyo, Japan

[21] Appl. No.: 28,990

[22] Filed: Apr. 11, 1979

Related U.S. Application Data

[63] Continuation of Ser. No. 843,600, Oct. 19, 1977, abandoned, which is a continuation of Ser. No. 756,696, Jan. 4, 1977, abandoned, which is a continuation-in-part of Ser. No. 552,203, Feb. 24, 1975, abandoned.

[30] Foreign Application Priority Data

Feb. 26, 1974 [JP] Japan ................................. 49-21983

[51] Int. Cl.$^2$ ............................................. C01B 1/00
[52] U.S. Cl. ................................... 423/649; 528/388
[58] Field of Search ......................................... 423/649

[56] References Cited

U.S. PATENT DOCUMENTS 2,937,076  5/1960  Class et al. .......................... 423/649

*Primary Examiner*—O. R. Vertiz
*Assistant Examiner*—Wayne A. Langel
*Attorney, Agent, or Firm*—Oblon, Fisher, Spivak, McClelland & Maier

[57] ABSTRACT

A process for ortho-para-hydrogen conversion characterized by the use as a catalyst of a sulphur-containing semiconductive polymer produced by the dehalogenation of a poly(tetrahalophenylene sulphide) in the presence or absence of an organic solvent at 150°–500° C.

8 Claims, No Drawings

PROCESS FOR ORTHO-PARA-HYDROGEN CONVERSION

CROSS-REFERENCE TO RELATED APPLICATIONS

This application is a continuation of application Ser. No. 843,600, filed on Oct. 19, 1977, now abandoned, the contents of which are hereby incorporated by reference, which, in turn, was a continuation of Ser. No. 756,696, filed on Jan. 4, 1977, now abandoned, which, in turn, was a continuation-in-part of Ser. No. 552,203, filed on Feb. 24, 1975, now abandoned.

BACKGROUND OF THE INVENTION

1. Field of the Invention

This invention relates to a process for ortho-para-hydrogen (inter-) conversion.

2. Description of the Prior Art

It is well known that the hydrogen molecule exists in either of two forms; in one, the two atoms constituting the molecule combine with their nuclear spins in the same directions (ortho-hydrogen) and, in the other, their spins in opposite directions (para-hydrogen). The ratio of the two spin isomers in an equilibrium composition is obtained as a function of temperature. At 0° C. or above, the hydrogen is in the form of ordinary hydrogen, consisting of 75% ortho-hydrogen and 25% para-hydrogen. With the lowering of the temperature, the hydrogen tends to contain more and more para-hydrogen until the percentage of the para content reaches 100% at the boiling point of hydrogen. The possibilities of the application of hydrogen in fuel, including the use of liquid hydrogen as a rocket fuel, are attracting growing attention. In those applications para-hydrogen is preferred because of its specific heat.

The rate at which hydrogen in a nonequilibrium state self-converts to an equilibrium state at a given temperature is nearly zero, even at room temperature. Practically it is next to impossible to obtain hydrogen of a desired equilibrium composition merely through temperature control. In order to effect the ortho-para-hydrogen conversion at a finite rate, some catalyst must be added to the system.

Known catalysts for the conversion have been limited to: precious metals, e.g., platinum, rhenium, and ruthenium, inorganic compounds, e.g., polyvalent transition metal oxides, e.g., trivalent manganese and iron in alumina, and chromina-alumina; and carbonaceous substances formed by calcining natural organic materials, e.g., bone-black and coconut char.

Recently, a group of organic complexes called "charge transfer complexes", e.g., alkali metal addition complexes of condensed aromatic ring compounds, have been found relatively effective in carrying out the ortho-para-hydrogen conversion. They are, nonetheless, not superior in conversion activity (particularly at low temperatures) to the conventional metal oxide catalysts.

We previously found that a poly(tetrahalophenylene sulphide) is prepared by polycondensation of a pentahalothiophenoxide in a basic solvent at 50°–200° C., and proposed it as a process for preparing the same (Japanese patent application Kokai (Laid-Open) No. 36299/1973).

It was also found that a sulphur-containing semi-conductive polymer results from dehalogenation of a poly(tetrahalophenylene sulphide) in the presence or absence of an organic solvent at 150°–500° C., and a Japanese patent was applied for on the process (Japanese patent application Kokai (Laid-Open) No. 42100/1973).

Further, it was found that, when a poly(tetrahalophenylene sulphide) or a sulphur-containing semiconductive polymer obtained by heat-treating the starting material is reacted with an alkali metal, a novel alkali metal-inserted compound with good stability and semiconductivity is produced. A Japanese patent was applied for on the process as such (Japanese patent application Kokai (Laid-Open) No. 46698/1973).

After the foregoing inventions, we found that the alkali metal-inserted compound, although fairly stable in the air as compared with other alkali metal complexes, has a very powerful catalytic activity for the ortho-para-hydrogen conversion. A Japanese patent was applied for on the process, too (Japanese patent application Koaki (Laid-Open) No. 46590/1973).

SUMMARY OF THE INVENTION

We further made an extensive search for compounds that would have excellent catalytic activity in the ortho-para-hydrogen conversion at low temperatures. The compounds must (1) be capable of accomplishing the conversion by a physical mechanism and should have a negative activation energy and an ununiform magnetic field, and (2) have as large a surface area as possible. As a result, the sulphur-containing semiconductive polymers were found to be our objective compounds. The present invention is predicated upon this discovery.

Our invention has for its object to provide a process for the ortho-para-hydrogen conversion characterized by the use of the sulphur-containing semiconductive polymer as a catalyst.

Particularly, our process comprises effecting the ortho-para-conversion of hydrogen by contacting the hydrogen at the desired temperature with the sulphur-containing semiconductive polymer. Although the actual structure of the sulphur-containing semiconductive polymer used in this invention is not known, it is believed that the structure corresponds to some extent to the general formula:

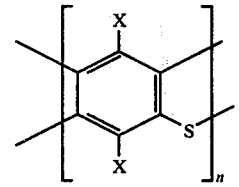

wherein X is a halogen and n has a value from about 40 to 700.

The method of producing these sulphur-containing semiconductive polymers are already known in Japanese patent application Kokai (Laid-Open) No. 42100/1973 as mentioned above.

The partial explanation of structure, as above defined, for this material has been obtained by elemental analysis, fragmentation by mass spectroscopy and measurement of the physical properties of the material.

The sulphur-containing semiconductive polymers to be employed as catalysts in accordance with this invention are made by the process of Japanese patent application Kokai (Laid-Open) No. 42100/1973 referred to hereinabove. That is, they are easily made by dehalogenating poly(tetrafluorophenylene sulphide), poly(tetrachlorophenylene sulphide), or poly(tetrabromophenylene sulphide) at a temperature of 150° to 500° C. in the presence or absence of an organic solvent.

DESCRIPTION OF THE PREFERRED EMBODIMENT

As noted above, the sulphur-containing semiconductive polymer used as a catalyst in the process of the present invention is obtained by dehalogenating a poly(tetrahalophenylene sulphide). The resulting product is believed to correspond approximately to the formula:

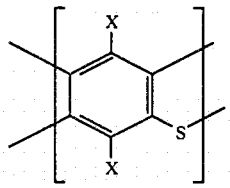

wherein X is F, Cl, or Br and the number of repeating units is from about 40 to 700. The actual number of the repeating units and the actual degrees of dehalogenation are not certain at this time.

When using an organic solvent, the temperature of dehalogenation is preferably 150°–300° C. In case an organic solvent is not used, the temperature is preferably 400°–500° C.

Some concrete examples of organic solvents for use are the following: pyridine derivatives, such as, pyridine, α-picoline, β-picoline and γ-picoline; formamide derivatives, such as, formamide and dimethyl formamide; acidic amide chemicals, such as, benzamide and acetamide; pyrrolidone derivatives, such as, 2-pyrrolidone and N-methyl-2-pyrrolidone; diethers, such as, dimethoxyethane, diethoxyethane and diethylene glycol dimethyl ether; organic nitriles, such as acetonitrile and benzonitrile; organic sulphoxides, such as, sulpholane and dimethyl sulphoxide; triamide phosphate derivatives, such as, hexamethyl triamide phosphate; organic tertiary amines, such as tri-n-butyl amine and dimethyl phenylamine; and pyrrole derivatives, such as, pyrrole, indole, pyrrolidine and indoline.

In the process of this invention, hydrogen gas of a composition dissimilar to the equilibrium composition of ortho- and para-hydrogen at the temperature for conversion is brought into contact with the catalyst at the conversion temperature.

The hydrogen taken out after the contact with the catalyst will have an ortho-para-hydrogen distribution either equal to that of the equilibrium composition at the conversion temperature or be closer to the latter than before the contact.

The contact may be effected at any temperature, although it is usually performed at between room temperature and the boiling point of liquid hydrogen.

The pressure of hydrogen gas in the process of this invention is not critical but generally under or at atmospheric pressure. Where desired, pressures higher than 1 atm may be used. In ordinary circumstances, it is preferably about 100 mmHg.

Experiments have proved that, at a very low temperature, such as, the temperature of liquid nitrogen or liquid hydrogen, ordinary hydrogen will be readily subjected to the conversion reaction with the catalysts according to this invention, and will be converted to the hydrogen close to the equilibrium composition at the specific temperature.

Under this invention, the ortho-para-hydrogen conversion is carried out at an extremely high rate, and hydrogen with a predominant ortho- or para-hydrogen content is prepared with ease. The catalysts according to this invention are particularly active at low temperatures.

The ortho-para-hydrogen conversion with the catalysts of this invention may be analyzed as a first-order reaction. The rate constants of the conversion are of the order of $10^{-4}$ min$^{-1}$ at room temperature or thereabouts. The catalytic activities will be enhanced at lower temperatures, the rate constants being of the order of $10°$ min$^{-1}$ at the temperature of liquid nitrogen.

On the other hand, the rate constants of the conversion reactions in the presence of charge transfer complex catalysts, the recent additions to the catalyst group, are usually between $10^{-2}$ and $10^{-4}$ min$^{-1}$ [cf H. Inokuchi et al., J. Catalysis, 14, 1–3 (1969)]. Where chromina-alumina, a typical metal oxide catalyst, is employed, the rate constants range from $10^{-4}$ to $10^{-5}$ min$^{-1}$. Hitherto, it has been estimated that high rate constants, of the order of $10^{-1}$ min$^{-1}$, are attained only when precious metals, such as, platinum, rhenium, tungsten, and ruthenium are used [P. W. Selwood, J.A.C.S., 88, 2676 (1966); F. T. Jones et al., J. Phys. Chem., 73, 894 (1969); H. Kubicka, J. Catalysis, 20, 163 (1971), etc.].

Of the above-mentioned catalysts, those in wide use are precious metals and metal oxides. Their catalytic activities depend on their chemical mechanism (whereby hydrogen atoms into which hydrogen molecules have been dissociated are recombined to form an equilibrium mixture of ortho-hydrogen molecules and para-hydrogen molecules). For this reason the high rate constants given above are attained at normal to high temperatures, but the catalytic activities decline in low temperature regions. In contrast to this, the activities of the sulphur-containing semiconductive polymers according to this invention rely on a physical mechanism which, in turn, is based on the ununiform magnetic field on the catalyst surface (the mechanism being such that, when the hydrogen molecules fall into the ununiform magnetic field, their interaction with the magnetic field will induce the ortho-para-hydrogen conversion). Therefore, the activation energies have negative values, and the lower the temperature range the higher the catalytic activities will be.

As stated, the sulphur-containing semiconductive polymers of the present invention are more active than conventional catalysts, especially at low temperatures. Moreover, because of the absence of metals, the catalysts of this invention avoid the problem of environmental pollution and are less costly than precious metals.

Conversion from ortho- into para-hydrogen is accompanied by the evolution of heat. The quantity of heat thus produced is greater than that which hydrogen developes as it evaporates at atmospheric pressure. When storing liquid hydrogen, therefore, it is necessary beforehand to convert ordinary hydrogen into para-hydrogen. In view of this, the catalysts of this invention offer a great industrial advantage in that they permit the preparation of para-hydrogen in a highly efficient way.

As para-hydrogen converts into ortho-hydrogen, the heat of conversion is naturally absorbed from the outside of the system. It will then be appreciated that the heat absorption will be rapidly carried out by the use of a catalyst according to this invention, and hence an efficient refrigeration process will be realized.

EXAMPLE 1

Into a reaction cell was introduced, in an atmosphere of argon, 200 mg. of sulphur-containing semiconductive polymer powder obtained by dehalogenating poly(tetrafluorophenylene sulphide) in pyridine at 250° C. The cell was connected to a high vacuum vessel equipped with a hydrogen gas feed cock, a manometer, and a switch cock leading to a gas chromatography apparatus.

The reaction cell was heated to 100° C. at $10^{-6}$ mmHg, and kept under vacuum for 5-6 hours to remove adsorbed oxygen.

Next, the cell was kept at 40° C. by a water bath, and hydrogen gas of a composition preadjusted to contain 79.9% para-hydrogen was introduced in 100 mmHg of the pressure of hydrogen gas into the cell through the feed cock. After the lapse of 3 hours, 22 hours and 5 minutes, and 29 hours and 10 minutes, the switch cock communicated with the gas chromatography apparatus was opened to sample the hydrogen from the system for analysis by gas chromatography.

The para-hydrogen contents of the charge as measured at the ends of the three different periods after the introduction of hydrogen gas were 77.3%, 58.9%, and 55.2%, respectively.

The rate at which the para-hydrogen content decreased was analyzed as a first-order reaction in terms of the para-hydrogen concentration. The rate constant thus determined was $3.4\times10^{-4}$ min$^{-1}$.

EXAMPLE 2

Using the same catalyst and by the same procedure as in Example 1, the ortho-para-hydrogen conversion reactions were carried out at 80° C. and 77° K.

The rate constants determined at the two different temperatures were $3.1\times10^{-4}$ min$^{-1}$ and $7.6\times10^{-2}$ min$^{-1}$, respectively.

From the results of Examples 1 and 2, the activation energy of the reactions was found to be approximately $-0.5$ kcal/mol.

EXAMPLE 3

The ortho-para-hydrogen conversion was performed in the same manner as described in Example 1 but using a sulphur-containing semiconductive polymer obtained by dehalogenating poly(tetrachlorophenylene sulphide) in pyridine at 250° C., at 80° C., 40° C., and 77° K.

The rate constants determined at the three different temperatures were, respectively, $3.5\times10^{-4}$ min$^{-1}$, $4.1\times10^{-4}$ min$^{-1}$, and $4.1\times10^{-3}$ min$^{-1}$.

The activation energy of the reactions was negative as is usually expected with a physical mechanism, the value thereof being about $-0.7$ kcal/mol.

EXAMPLE 4

With a sulphur-containing semiconductive polymer prepared by dehalogenating poly(tetrabromophenylene sulphide) at 400° C., the ortho-para-hydrogen conversion was effected in the same way as in Example 1, at 80° C., 40° C., and 77° K.

The rate constants at the three different temperatures were $3.2\times10^{-3}$ min$^{-1}$, $4.0\times10^{-3}$ min$^{-1}$, and $1.2\times10^{0}$ min$^{-1}$, respectively.

The activation energy of these reactions was again negative, the value thereof being about $-1$ kcal/mol.

What is claimed is:

1. In a process for the ortho-para conversion of hydrogen wherein hydrogen is contacted with a catalyst at the desired conversion temperature, the improvement which comprises said catalyst being a sulphur-containing semiconductive polymer produced by dehalogenating a poly(tetrahalophenylene sulphide) in the presence or absence of an organic solvent at a temperature from 150° to 500° C.

2. The process of claim 1, wherein the dehalogenation is carried out in an organic solvent at a temperature from 150° to 300° C.

3. The process of claim 1, wherein the dehalogenation is carried out in an organic solvent at a temperature from 250° to 300° C.

4. The process of claim 2 or 3, wherein the organic solvent is at least one compound selected from the group consisting of pyridine, α-picoline, β-picoline, γ-picoline, formamide, dimethyl formamide, benzamide, acetamide, 2-pyrrolidone, N-methyl-2-pyrrolidone, dimethoxyethane, diethoxyethane, diethylene glycol dimethyl ether, acetonitrile, benzonitrile, sulpholane, dimethyl sulphoxide, hexamethyl triamide phosphoate, tri-n-butylamine, dimethylphenylamine, pyrrole, indole, pyrrolidine and indoline.

5. The process of claim 2 or 3, wherein the organic solvent is pyridine.

6. The process of claim 1, wherein the dehalogenation is carried out in the absence of any organic solvent at a temperature of 400° to 500° C.

7. The process of claim 1, 2 or 6, wherein the poly(tetrahalophenylene sulphide) is poly(tetrafluorophenylene sulphide), poly(tetrachlorophenylene sulphide) or poly(tetrabromophenylene sulphide).

8. The process of claim 1, 2 or 6, wherein the ortho-para-hydrogen conversion is effected at a temperature from the boiling point of liquefied hydrogen to 80° C.

* * * * *